May 1, 1951  E. G. SMITH  2,551,175
FILTER CLOTH
Filed Nov. 4, 1949
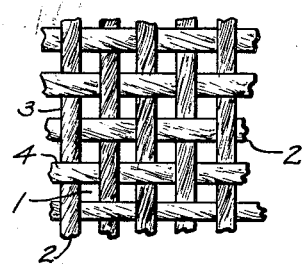
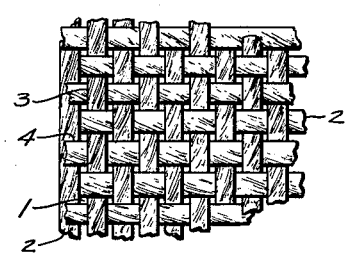
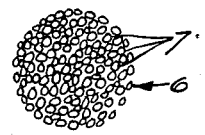
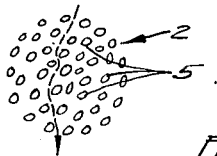
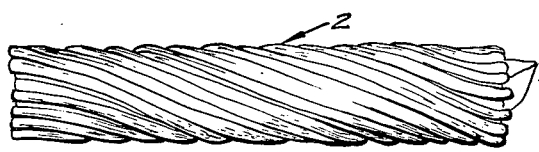
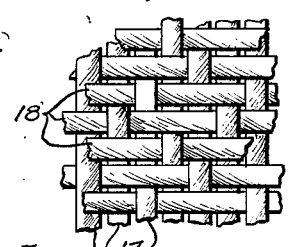
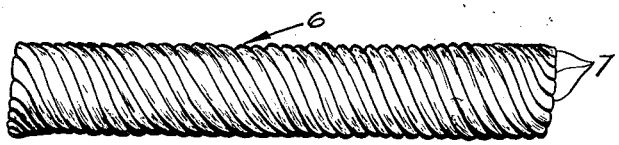
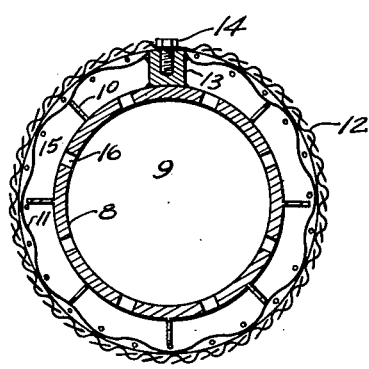
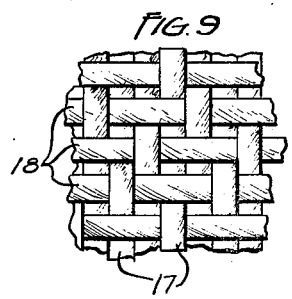
Inventor
EDMUND G. SMITH
By Semmes, Keegin, Robinson and Semmes
Attorneys Patented May 1, 1951

2,551,175

UNITED STATES PATENT OFFICE 2,551,175

FILTER CLOTH

Edmund G. Smith, Cedar Grove, N. J.

Application November 4, 1949, Serial No. 125,543
In Canada March 4, 1949

3 Claims. (Cl. 210—204)

1

This invention relates to fabrics and more particularly to fabrics suitable for use as a filtering medium.

This application is a continuation-in-part of my co-pending application Serial No. 706,994, filed October 31, 1946, which has become abandoned, for Filter Cloth.

A wide variety of materials have been used to separate solid particles from fluids. These materials vary in porosity from extremely coarse metal strainers to rather dense unglazed porcelains. The choice of the filtering medium used, of course, will depend upon the degree of separation that is desired between the liquid and solid or semi-solid particles and the relative ease with which the filtered solids can be separated from the filtering medium.

In many applications cloths are used to effect the desired separation because of their availability, ease of handling and relatively low cost. One of the great difficulties encountered in the filtration of fluids by the use of cloths is plugging of the filter cloth. Some of the solid particles in the liquid may become entrapped between individual filaments in the yarn of the filter cloth in such a manner that they cannot be easily removed. Often when filtering relatively saturated solutions, solid materials are precipitated or crystallized out of solution in the space between the filaments of the yarn. The precipitated or crystallized solids act as a nucleus for formation of larger deposits which encompass not only the entire strand of yarn, but the openings between adjacent strands of yarn and thereby plug the cloth so that the formation of successive filter cakes is prevented as the cloth is then impervious to liquor flow.

Solid or semi-solid particles entrapped between individual filaments of the yarn, adhere to the filtered cake, making it difficult to separate the cake from the filtering medium or preventing separation altogether, depending on the quantity of entrapped solids and the nature of the filtered cake being separated.

When filtering organic liquids or liquids containing organic materials, the growth of bacteria on the filtering medium sometimes produces slimes which greatly reduce the through-put of the filter cloth. These bacterial or fungus growths occur on organic solids entrapped in the space between the individual filaments of the yarn, gradually increasing in size until not only the entire strand of yarn is encompassed, but the openings between adjacent strands of yarn. The cloth then becomes impervious to liquor

2 flow and the formation of successive filter cakes is prevented. Most of the methods of de-sliming the filtering cloth that are now available, have deleterious effects upon the cloth and reduce its period of satisfactory use. De-sliming of the cloth removes only the slime and not the organic solids on which the slimes have grown. From this, it will be seen that bacterial or fungus growth will proceed as soon as the cloth is put back in use. In addition, it is ordinarily necessary to remove the filter from operation while de-sliming of the filtering medium is taking place; consequently, the effective capacity of the filter is reduced because of its period out of service.

In the operation of many conventional types of filters, separation of the filtered cake from the filter medium is wholly or partially accomplished by forcing air, gas or liquid back through the filter medium in the opposite direction from which the liquor moved when the filtered cake was formed. The ease of separation of the filtered cake from the filter medium is dependent upon the rate at which the air, gas or liquid will pass back through the filter medium. It has been demonstrated that from 50% to 90% of the air, gas or liquid passing through a conventional filter cloth, made from the usual low twist, multifilament yarn, actually passes between the individual filaments of the yarn, with only from 2% to 50% of the flow passing through the openings between adjacent strands of yarn. When solid or semi-solid particles, bacterial or fungus growths, precipitated or crystallized solids, fill up the space between filaments of the yarn, loss of porosity is so great as to either seriously interfere with or prevent the passage of air, gas or liquid being employed to effect separation of the filtered cake from the filter medium.

Conventional cloth filtering media do not give satisfactory results, when used with suspensions of solid or semi-solid particles consisting in whole or in part of fibrous materials, due to the fact that such fibrous materials rapidly become entrapped between the filaments of the yarn and cannot be removed by back washing or mechanical means. The result being that a rapid loss of porosity takes place, seriously interfering with, or entirely preventing, separation of the filtered cake from the filter medium. Furthermore, the reduction in porosity is so great as to materially affect the flow of fluid during that part of the cycle when it is desired to filter a deposit of solids on the medium.

The foregoing difficulties, described above, become more apparent as the number of filaments in, or denier of, each strand of yarn is increased.

It is an object of this invention to provide a filter cloth which will not become plugged by the entrapment of solid particles between the individual filaments in the yarn.

Another object of this invention is to provide a filter cloth in which there will not be a multitude of loose ends extending from the surface of the yarn to entrap solid particles.

A further object of this invention is to provide a filter cloth which inhibits bacterial and fungal growths.

Still another object of this invention is to provide a filter cloth which is resistant to periodic exposure to chemicals used in the de-sliming of the cloth.

It is also an object of this invention to provide a filter cloth woven from a yarn which is in effect a mono-filament but does not provide interstices in which the solid particles may be precipitated.

With these and other objects in mind, this invention resides in a filter cloth woven from a yarn which has been tightly twisted to form a strand approaching a mono-filament in density. The twist is such that only colloidal or semi-colloidal particles can pass through the inter-filament spaces of the yarn. The yarn is completely impervious to filterable solids. It is preferred that the yarn be prepared from nylon filaments, but cloths embodying the concept of this invention may be produced using other synthetic filaments having the necessary chemical resistance, mechanical strength and hydrophobic characteristics, such as Orlon, Vinyon, Saran, Teflon, and certain metallic filaments such as stainless steel.

The chemical definitions of the above mentioned synthetic plastics are as follows:

Nylon—a linear polymeric amide which has recurring amide groups as an integral part of the main polymer chain and which is capable of being formed into filaments in which the structural elements are oriented in the direction of the axis.

Vinyon "N"—vinyl chloride-acrylonitrile copolymer.

Vinyon "CF"—vinyl chloride-vinyl acetate.

Saran—vinylidine chloride.

Orlon—acrylonitrile fibre.

In the drawings:

Fig. 1 is a magnified view of an "open" filter cloth;

Fig. 2 is a magnified view of a more tightly woven filter cloth;

Fig. 3 is an end view of a magnified strand of yarn used in the manufacture of the filter cloth of this invention;

Fig. 4 is a cross section, also highly magnified, of conventional yarn used in the manufacture of cloth;

Fig. 5 is a magnified lateral elevation of a conventional strand of yarn used in the weaving of fabrics;

Fig. 6 is an elevation similar to Fig. 5 of the strand of yarn used in this invention;

Fig. 7 is a cross sectional view of a slotted tube of a filter in which the cloth of this invention is used as the filtering medium;

Fig. 8 is a highly magnified view of a filter cloth having a particularly desirable weave; and Fig. 9 is a view, also highly magnified, of the cloth illustrated in Fig. 8 in which the filler threads are bunched.

In the filtering of fluids through an open filter cloth of the type illustrated in the magnified view shown in Fig. 1, a major portion of the fluids being filtered pass through the apertures 1 between the strands 2 of the fabric. Actually the apertures 1 in any cloth that is satisfactory as a filter cloth would be much smaller in proportion to the size of the yarn than is shown in Fig. 1. The apertures were enlarged in the drawings to aid in the description of the mechanism of the filtering process. In addition to the fluid passing through the apertures 1 a considerable portion will also pass through the strands of yarn especially at the area 3 adjacent to the apertures and at intersections 4 where the strands overlie one another. The fluid passing through the strands follows a path similar to the dotted line through the strand of yarn illustrated in Fig. 4.

Because of the loose structure of the yarn ordinarily used in filter cloths, the portion of the fluid passing through the yarn between the individual filaments 5 thereof is an important part of the total fluid filtered. Actually the yarn illustrated in Fig. 1 would serve as little more than a strainer for the fluid and in most cases would not be satisfactory as a filter material.

It is usually necessary to employ a very tightly woven cloth as the filter medium to prevent the passing of particles of relatively large size through the apertures between the various strands of the filter cloth. The cloth illustrated in Fig. 2 is more typical of the type of weave required, but even it has the apertures enlarged somewhat to aid in illustration of the filtering mechanism.

Referring to the cloth in Fig. 2 some of the fluid will still pass through the apertures 1, but because of the relatively small part of the area of the cloth that these apertures fill, the portion of the fluid penetrating the strands of yarn is increased considerably. If a substantial portion of the liquid diffuses between the individual filaments, solid particles will be trapped between adjacent filaments within the individual strands of yarn. Often when saturated solutions or solutions in which the solid particles are extremely finely divided are filtered, the solid particles trapped between the individual filaments form nuclei upon which more solid material is precipitated from the liquid, or crystallized from solution. Obviously, a continuation of this process results in the cloth becoming completely plugged, since such depositions or crystalline growths eventually become large enough to cover up the apertures between the strands of yarn.

When filter cloths in which solid particles have been deposited between the individual filaments in the strands of yarn are back-washed for cleaning, it is difficult to remove the solid particles completely. They become so entrapped during the filtering that they are not free to move in any direction. Consequently, satisfactory cleaning of the filter medium is not possible and rapid plugging occurs when the filter medium is put back in service. This plugging is especially aggravated when the liquid contains solid fibrous particles which become lodged between the filaments and are very difficult or more frequently impossible to remove.

The filter cloth of this invention is woven from a yarn 6 so tightly twisted that the filterable material will not pass through the yarn between the individual filaments 7 comprising it. In a yarn thus prepared, the individual filaments 7 are tightly twisted and packed together to form a strand of yarn approaching a mono-filament in many characteristics. From a filtering standpoint, the most important characteristic of this yarn is that the filterable material cannot pass into the yarn and become deposited or entrapped between the filaments 7 and to that extent plug the filter cloth by the several conditions described heretofore. Because of the density of the yarn, all solid materials are deposited on the outer surface of the strand even though a small portion of the liquid could conceivably diffuse through the strand.

A yarn prepared according to this invention may be composed either of a number of filaments twisted together to form a single yarn or by twisting a number of plies or ends, each of which comprises a plurality of filaments of low degree of twist.

The degree of twist required for the above purpose is dependent upon the denier, a higher twist being required with a lower denier yarn and vice versa. The following table lists representative yarns. In this table the yarns above 200 denier are plied from ends having only the producer twist (approximately 3 turns per inch) which may be considered as untwisted ends. The plied yarns are twisted after plying.

| Denier | Range | Preferred Turn |
| --- | --- | --- |
| 30 | 15–40 | 35 |
| 50 | 15–40 | 35 |
| 60 | 15–40 | 35 |
| 70 | 15–40 | 35 |
| 100 | 10–30 | 25 |
| 200 | 10–25 | 20 |
| 400 | 10–25 | 15 |
| 600 | 8–15 | 10 |
| 800 | 5–15 | 8 |
| 1,200 | 4–10 | 6 |

A yarn produced from a plurality of filaments tightly twisted together approaches the density of a mono-filament without having the stiffness that would be inherent in a mono-filament of like diameter. It is important that the yarn be flexible to permit a tightly woven filter cloth. A stiff yarn, such as would be the case if the yarn were of mono-filament, is difficult to weave, and results in a fabric with large apertures similar to those in Fig. 1. Because of the difficulty in weaving mono-filaments tightly, they have not been satisfactory for the production of filter cloths for filtering finely divided particles.

A further advantage of this invention is that the size of the opening through which the liquid passes may be more closely controlled than is possible when using loosely twisted yarns in the weaving of the filter cloth. In this invention practically all of the fluid is directed through the apertures between the strands of yarn, which allows the size of the opening through which the liquid passes to be controlled by the tightness of the weave of the filter cloth. Thus, fine control of the degree of separation between liquids and solids is possible.

Ordinarily it is necessary to use a continuous filament material in the preparation of the yarn for the weaving of the filter cloth of this invention. The usual natural-occurring materials, such as cotton or wool, used in fabrics have a relatively short fiber length and generally are not satisfactory because when tightly twisted to form a dense strand, a multitude of loose fiber ends protrude more or less radially from the surface of the strands. These loose ends tend to trap solid particles in much the same manner as was described for the filaments in the loosely twisted yarns.

Yarn produced from continuous filament materials ordinarily possesses a high tensile strength without being highly twisted, and most yarns produced from such materials have a low twist when received from the manufacturers. However, in this invention, it is desirable that the yarn have both a continuous filament to reduce the number of loose ends protruding from the strand of yarn and be tightly twisted to increase its density. Nylon, Saran, Orlon and Vinyon have been found to be eminently satisfactory in these respects.

A filter cloth prepared according to this invention may be easily and effectively cleaned. Any solid particles separated from the fluid are stopped at the surface of the cloth. The surface of the cloth is relatively hard and smooth and offers little opportunity for the solid particles to become trapped or entangled between individual filaments of the strands of yarn. Thus, the porosity of the cloth itself is maintained at all times.

Often the principal cause of plugging the filter cloth is the growth of bacteria and fungus on organic solids or semi-solids trapped between the individual filaments of the yarn. These growths are in most cases of a slimy, impervious nature which tends to completely stop the flow of the fluid being filtered. Ordinarily, bacteria or fungus growths cannot be removed from the filter cloth by back-washing, but require periodic de-sliming. The de-sliming can be accomplished by chlorine, chlorine compounds, trisodium phosphate, or specially prepared cleansing agents. It is apparent that the overall capacity of the filter will be reduced if it must be taken out of operation for periodic de-sliming. In addition, the materials most commonly used in filter cloths are attacked to some degree by the various cleaning agents which shorten their lives.

The continuous filament materials above mentioned permit the formation of a smooth strand which does not have a multitude of loose ends protruding from its surface to entrap particles being separated from the fluid. The dense nature of the strand also inhibits the entrapment of solid particles within the strand. Thus, the solid particles separated from the fluid are in a position where they can be completely and easily removed from the surface of the filter cloth. Inasmuch as the bacterial and fungus growths develop on solids lodged in the filter cloth, such a growth is discouraged on a cloth of the nature described because of the absence of those solids.

Many of the advantages derived from using the yarn herein described may be realized in fabrics of widely varying weave. In filtering liquids containing contaminants of relatively large particle size, the balanced taffeta weave shown in Figs. 1 and 2 is satisfactory. In filtering liquids containing contaminants of comparatively small particle size, an unbalanced taffeta weave may be used, wherein the number of warp ends will be greater than the number of pics in the filling, permitting the construction of a cloth with smaller apertures between yarn strands. The absence of adjacent parallel threads discourages the lodging of fibrous particles in the openings between the threads, and the tightly twisted yarn prevents fibrous particles from lodging in the yarn. In the filtering of a liquid containing very fine particles, however, it is often difficult to weave a taffeta cloth tightly enough to prevent passage of particles through the openings between the yarn threads.

A weave of the type illustrated in Figs. 8 and 9 has been found to be excellent for separating very fine particles from fluids. While the satin weave illustrated has a number of adjacent threads lying parallel for short lengths the bunching of the filling threads 17, as is best illustrated in Fig. 9 allows the fabric to be tightly woven and yet presents a surface similar to that of a taffeta weave to the contaminated fluid. It is, of course, necessary to mount the cloth on the filter element with the side of the cloth illustrated in Fig. 9 towards the contaminated fluid. Since the warp threads 18 are not crowded, the filling threads 17 are parallel and lying close together on the under side of the cloth thereby forming long, narrow openings which would trap fibrous particles.

The filter cloth of this invention may be used with any of the conventional filter structures. For example, a slotted tube 8, such as is illustrated in cross section in Fig. 7, may be mounted in either a completely enclosed casing (not shown) or any tube-like structure. In most applications, the bore 9 of the tube will be in fluid communication with the outlet from the filter, but in some applications, it may be desirable to have the fluid flow from inside the tube outward through the filter cloth. Extending from the outer surface of the tube 8, are fins 10 which support a wire screen 11, wrapped about the tube. The wire screen 11 may also be replaced by an open mesh cloth when desirable. The filter cloth 12 may then be laid on the wire and held in position spaced from the walls of the tube. A bar 13 which is attached to the outer surface of the tube is tapped at regular intervals for screws 14. After the filter cloth has been wrapped around the filter element illustrated in Fig. 7, the screws 14 are tightened to hold it firmly in place.

In normal operation, the unclarified fluid approaches filter cloth 12 from the outside and the contaminating particles are removed as the fluid passes through the cloth. The fluid then flows in spaces 15 between the outer surface of tube 8 and wire 11 to slots 16 in the tube. After the fluid reaches bore 9, it may then flow to the filter outlet through any suitable conduits.

A filter cloth prepared according to this invention provides a filter medium which will permit high rates of flow therethrough and yet will provide satisfactory separation of contaminants from the fluid. Because of its novel structure, the cloth does not become plugged by solid particles becoming entrapped within the individual threads.

The filter cake, composed of the contaminating substances removed from the fluid, will build up on the external surfaces of the yarn forming the cloth and, consequently, may be easily removed by back-washing. In addition, if the concept of the invention is used with synthetic or metallic filaments, the cloth has been found to be extremely resistant to the formation of bacteria slimes which ordinarily plug filter cloths. These have further advantages because of their resistance to the harmful effects of many of the materials ordinarily used in de-sliming filter cloths.

Because of its strength, flexibility and low cost, filter cloths prepared according to this invention may be used to advantage in the usual structures designed for the straining or filtering of liquids. In order to describe this invention, it has been illustrated in the foregoing specification in detail. It is apparent that one skilled in the art may make numerous changes in these details without departing from the concept of this invention.

What is claimed is:

1. A fluid filter for separating filterable particles, comprising a pervious support, a filter cloth mounted thereon and means for conveying filtered fluid from said filter after passing through said cloth, said cloth being tightly woven entirely from a synthetic hydrophobic continuous filament yarn, each yarn being of 30 to 1200 denier and comprising a plurality of filaments twisted to a degree to permit only colloidal or semi-colloidal particles to pass through the interfilament spaces and being completely impervious to the filterable particles, the twist varying inversely as the denier in accordance with the following table:

| Denier | Twist in Turns Per Inch |
| --- | --- |
| 30 | 15–40 |
| 50 | 15–40 |
| 60 | 15–40 |
| 70 | 15–40 |
| 100 | 10–30 |
| 200 | 10–25 |
| 400 | 10–25 |
| 600 | 8–15 |
| 800 | 5–15 |
| 1,200 | 4–10 |

2. A filter, as set forth in claim 1, in which said yarn is of 1200 denier and has a twist of 6 turns per inch.

3. A filter, as set forth in claim 1, in which said yarn is of 30 denier and has a twist of 35 turns per inch.

EDMUND G. SMITH.

REFERENCES CITED

The following references are of record in the file of this patent:

UNITED STATES PATENTS

| Number | Name | Date |
| --- | --- | --- |
| 1,000,405 | Healy | Aug. 15, 1911 |
| 1,696,367 | Stephens | Dec. 25, 1928 |
| 2,006,543 | Dreyfus | July 2, 1935 |
| 2,215,938 | Schonholzer | Sept. 24, 1940 |
| 2,229,582 | Merrill | Jan. 21, 1941 |
| 2,252,554 | Carothers | Aug. 12, 1941 |
| 2,313,904 | Brederode | Mar. 16, 1943 |

OTHER REFERENCES

Chemical and Engineering News, Dec. 1, 1947, page 3605.